United States Patent [19]

Kuhns et al.

[11] Patent Number: 5,294,279
[45] Date of Patent: Mar. 15, 1994

[54] LOW MANUFACTURING COST PRESENTATION OR SECURITY FOLDER

[76] Inventors: Roger J. Kuhns, Tower Rd., Lincoln, Mass. 01773; Robert L. Nathans, 36 Stag Dr., Billerica, Mass. 01821

[21] Appl. No.: 964,967

[22] Filed: Oct. 22, 1992

[51] Int. Cl.$^5$ ............................................. C09J 5/02
[52] U.S. Cl. ................................. 156/324.4; 40/359; 156/226; 156/227; 156/292; 283/109; 428/13; 428/121
[58] Field of Search ............... 156/324.4, 226, 292, 156/227; 428/121, 13; 40/359; 283/109

[56] References Cited

U.S. PATENT DOCUMENTS

| | | | |
|---|---|---|---|
| 4,185,405 | 1/1980 | Giulie | 283/109 |
| 4,448,834 | 5/1984 | Pohl | 156/227 |
| 4,456,639 | 6/1984 | Drower et al. | 283/109 |
| 4,589,942 | 5/1986 | Korinek | 156/324.4 |
| 5,100,181 | 3/1992 | Nathans et al. | 283/109 |

Primary Examiner—John J. Gallagher

[57] ABSTRACT

Two plastic cover sheets, each of which would produce warping upon lamination by heat and pressure, are loosely affixed to a presentation folder paper core sheet to provide a plastic envelope. Graphic indicia bearing insert sheets can be laminated between both sides of the core sheet and the plastic cover sheets to provide an attractive display of the graphic indicia. Manufacturing costs are saved since anti-warpage backing sheets need not be face laminated to substantial areas of the folder sheet. Also, the plastic envelope sold to the user before lamination is not bowed in contrast to the prior art envelope. A security folder which is difficult to compromise, using carbonless paper, is also disclosed.

9 Claims, 1 Drawing Sheet

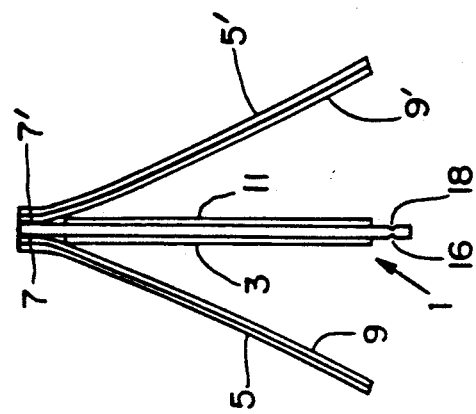
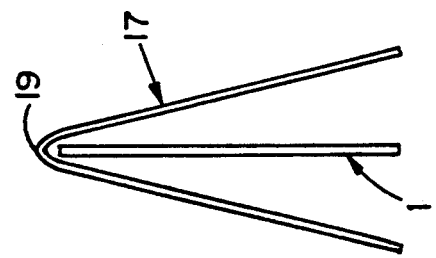
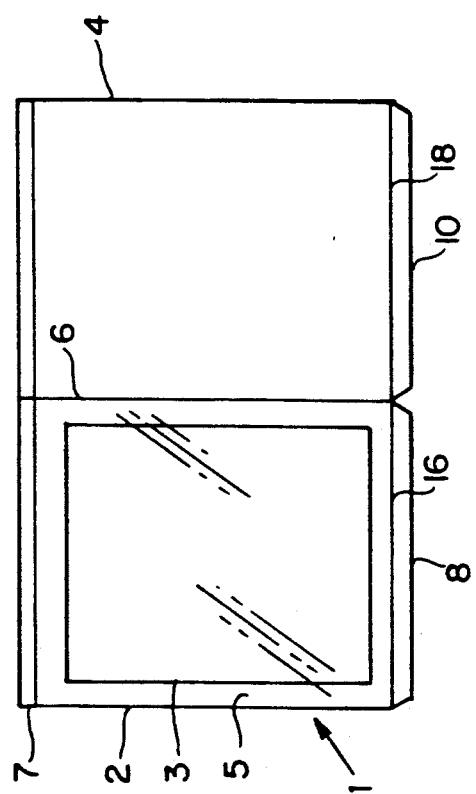
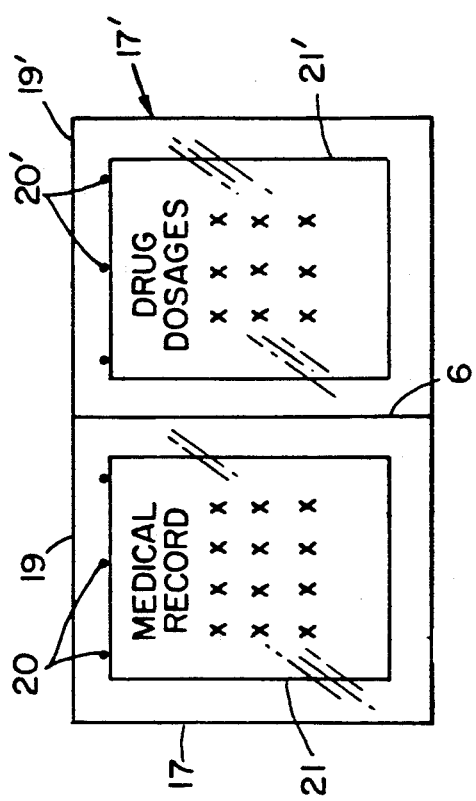

LOW MANUFACTURING COST PRESENTATION OR SECURITY FOLDER

BACKGROUND OF THE INVENTION

The present invention relates to the field of laminated plastic display devices and includes presentation folders for use in marketing goods and services.

A common type of presentation folder is made of rectangular paper stock having a thickness of about ten mils. A centrally positioned vertical fold separates a left half portion from a right half portion, at least one portion having a pouch formed at the bottom of the folder for containing sales literature and the like. Customized graphic indicia such as a company logo and a description of the literature within the folder and other information is sometimes printed on the cover of the folder by a print shop. Sending the folder to an outside print shop can result in detrimental delays and furthermore is costly, particularly if only small numbers of folders are to be printed.

We thus designed a presentation folder whereby a thin sheet of such customized graphic indicia, which can be quickly and economically produced by a desk top publishing PC program, is heat laminated to the front face of the folder. An economical structured transparent plastic polyester sheet is provided and is tack welded to the paper folder and a heat activatable polyethylene adhesive upon the polyester, faces the front of the paper folder. The user thereafter inserts the indicia bearing display sheet between the transparent polyester plastic sheet and the folder sheet and the three items are laminated together by heat and pressure.

As explained in detail in prior art U.S. Pat. No. 5,042,843, issued to Roger Kuhns et al., and assigned to Avant Incorporated of West Concord Mass., the transparent plastic cover sheet which was intentionally stressed during manufacture to strengthen it, became unstressed and shrank after lamination, and the result was a severely warped or bowed product which was unacceptable from an aesthetic point of view. The solution to this problem, also described in the patent, of warpage or bowing of large heat activatable plastic sheets when laminated by the user to the front covers of the folders, involved laminating a backing sheet to substantial portions of the inside face of the folder opposite the front face before shipment to the user, and as a result, the user receives a bowed intermediate product, which however becomes unbowed upon the final lamination of the finished product by the user.

BRIEF SUMMARY OF THE INVENTION

It is desirable to provide an alternate envelope design which has certain advantages over the design described in the aforesaid patent. Instead of heat laminating the anti-bowing plastic backing sheet directly to substantial portions of the inside of the paper core or folder sheet, as explained above, we provide the user with first and second loose transparent plastic cover sheets having heat activatable adhesive facing the paper core sheet sandwiched therebetween. Just before lamination, the indicia bearing graphic insert sheets are positioned by the user between the plastic cover sheets and the central core sheet, and against the edges of the plastic cover sheets aligned with a top edge of the central paper core sheet. The inserts, the plastic cover sheets and the paper core sheet are all then laminated together by heat and pressure during one pass through the laminator.

A first advantage of this design is that the user receives an envelope which is not substantially bowed, in contrast with the envelope of the aforesaid patent. This bowing could displease a number of prospective customers and reduce sales to a degree. A second advantage of the design of the invention is that manufacturing costs are saved, as will be explained in detail below, since the plastic sheets need not be laminated to the paper core sheet at the factory. A third advantage of the design is that the quantity of indicia bearing graphic inserts which can be laminated is doubled.

BRIEF DESCRIPTION OF THE DRAWINGS

Other objects, features and advantages of the present invention will become apparent upon reading the following detailed description taken in conjunction with the drawings in which:

FIGS. 1 and 2 illustrate a preferred embodiment of the invention; and

FIG. 3 illustrates an alternate envelope design which need not be laminated to the paper folder upon manufacture; and FIG. 4 illustrates a double-width envelope design somewhat similar to the envelope of FIG. 3 except the fold is tack welded to the upper edge of the folder at the factory.

DETAILED DESCRIPTION OF EMBODIMENTS OF THE INVENTION

A first embodiment of the invention is illustrated in FIG. 1, wherein the plastic envelope occupies the left half of the aforesaid presentation folder. The 10 mil paper folder sheet 1 has a vertically oriented fold 6 which divides a left hand half portion 2 from a right hand half portion 4. First and second pouch forming flaps 8 and 10 are attached to bottom portions of the folder sheet via score lines 16 and 18 respectively. Fold 6 can be also scored in like manner. The scoring could consist of merely a fold or optionally, universally employed micro-perforations, well known in the art, in order to make them virtually invisible, to enhance the appearance of the product.

The left hand major folder portion 2 has a light transmissive plastic cover sheet 5 shown in FIG. 2, heat sealed to a minor folder portion of a first or inside face of the folder via seal 7, upon manufacture. An additional loose cover sheet 5' is heat sealed to the opposite second or outside face of the paper core sheet via heat seal or tack weld 7', also upon manufacture. Each plastic cover sheet has the same physical characteristics which would cause each cover sheet to individually warp to an unacceptable degree when separately laminated to the core sheet as discussed above, and the sheets have dimensions at least as great as a file folder when folded. The envelope is then sold to the user.

A custom printed insert sheet 3 bearing indicia such as "Avant" is positioned by the user between heat activatable portion 9 of the plastic cover sheet and the front face of the left hand portion of the paper folder sheet. If the second cover sheet 5' is also light transmissive, a second indicia bearing sheet 11 may be inserted in like manner between the cover sheet 5', with its heat activatable adhesive 9', and the paper folder sheet, which becomes a centralized core sheet.

The user now folds the right hand paper folder portion about the vertical fold line 6 so that the right hand portion covers the plastic cover sheet or flap 5, and the resulting sandwich is passed through a roller laminator which laminates both cover sheets to the core sheet by heat and pressure. The right hand folder half thus acts as a self carrier to help distribute pressure more evenly. Typical applied temperatures can vary widely between 175-400 degrees F. depending on the thickness of the stock and the angular velocity of the laminator rollers. The heat and pressure of lamination causes the polyethylene heat activatable adhesive layers 9 and 9' to melt and laminate the polyester cover sheets 5 and 5' to the insert sheet or sheets and paper core sheet along the border surrounding the insert sheet. After lamination, the "shirt-tail" flaps 8 and 10 can be folded upwardly and affixed to the folder sheet by pressure sensitive patches or staples to form pouches for holding data sheets relating to an item being sold, for example.

Optionally, the display envelope can be duplicated upon the right hand half of the folder sheet 4 and thus up to four indicia bearing graphic display sheets may be laminated to the paper core or folder sheet. As explained in detail in U.S. Pat. No. 5,090,732, to Roger Kuhns et al., assigned to Avant Inc., the "shirt-tail" flaps 8 and 10 may be separated from the folder sheet and discarded to form a two part stand-up display, and, going one step further, the right hand folder portion, after lamination, may be separated from the left hand portion to produce a single laminated sheet which may become a page in a book having comb or wire binding. Alternatively, such pages can be punched and inserted into a loose leaf book. Another use for the resulting single laminated sheet is discussed in detail in U.S. Pat. No. 5,100,181, also assigned to Avant Inc. The user inserts sheets of memorabilia between front and back transparent plastic cover sheets and the core sheet to produce a double sided display of nostalgic items such as photographs, theater tickets and the like. Other customized items may be laminated such as letters spelling out the name of a car owner, whereby the laminated display is mounted upon the front of the car in the manner of a license plate. Thus the resulting plastic display envelope can have various uses.

Recall that the earlier described solution to the bowing or warpage problem involved wide area lamination at the factory of the 8.5" by 11" plastic backing sheet to the rear face of the paper core sheet. By tack or spot welding the rear plastic cover sheet 5' to the rear face of the paper core sheet 1 at 7', shown in FIG. 2, manufacturing costs are saved since the rear plastic sheet need not be passed through a roll laminator for laminating the entire area of the 8.5" by 11" sheet to the core sheet; rather, the rear plastic sheet need only be very rapidly tack welded to the top edge portion of the core sheet. The result is a savings in labor cost as the passage of the envelope through the laminator takes much more time than the tack welding step. A jaw-like heating member would rapidly produce bar or spot tack welds 20, as shown in FIG. 4, or a bar seal.

Another advantage of this envelope is that the user or customer purchasing the envelope will not receive a bowed intermediate product which might displease a number of customers and possibly reduce sales somewhat. A third advantage is that the rear loose plastic cover sheet 5' can if desired be used to double the number of display inserts laminated to the folder of FIG. 1. Recall that lamination over a graphic colored insert sheet enhances its appearance and thus its sales appeal.

The second embodiment of the invention, partially shown in FIG. 3, can even eliminate the tack welding step, if desired. The envelope of FIG. 3 is similar to the aforesaid envelopes, except that the user is supplied with a double sized unitary plastic sheet member 17 wherein the aforesaid first and second sheets are joined together along a boundary portion consisting of a fold line 19. The fold line 19 would be formed or crimped at the factory so that when the user aligns the fold with the upper edge of the core sheet as shown in FIG. 3, the fold grips the paper core sheet to a sufficient extent to maintain the plastic cover sheets in place and aligned with edge portions of the core sheet 1. The user thereafter inserts one or more indicia bearing display sheets as before and performs lamination by heat and pressure to produce the final laminated product. This envelope can be sold separated from the folder or could be mounted thereon as shown in FIG. 3.

Should the user wish to laminate a plurality of indicia bearing display inserts on one or two sides of the paper core sheet 1, the possibility of slippage of the plurality of inserts just before lamination increases. Should even one insert slip, the insert edges will become misaligned with respect to the edges of the envelope to produce an unacceptable "cockeyed" product. This problem may be solved by printing a rectangular "wallpaper" pattern of dots of a weak pressure sensitive adhesive such as that made by Avery-Dennison or the 3M Corporation and sold under the trademark "Post-It". The dots permit the insert to be repositioned a number of times upon the core sheet until perfect edge alignment is attained, and the adhesive dots will prevent the aforesaid slippage before lamination. This technique is further described in U.S. Pat. No. 5,100,181, and assigned to Avant Inc. While FIG. 4 of this patent shows an envelope similar to FIG. 2, this patent is not prior art with respect to the present invention since the inventive entities are the same, and the patent issued on Mar. 31, 1992.

FIG. 4 shows another embodiment of the invention somewhat similar to the embodiment of FIG. 3. The folded plastic envelope 17 of FIG. 3 can be draped over the left-hand top edge portion of the core sheet 1, so that the fold 19 is adjacent the top edge of the core sheet. Optionally, another folded plastic envelope 17' could be draped over the right-hand portion of the paper core sheet. Such side-by-side folded plastic envelopes would be separated from each other by a narrow gap extending over the vertical fold 6. The upper edge portions of plastic envelope 17 and optionally, 17', may now be tack welded to the upper edge portions of the core sheet to produce bar or spot welds 20 and 20' shown in FIG. 4. We believe that this manufacturing technique would be quite economical since face lamination of large areas of the plastic cover sheets is avoided.

FIG. 4 also illustrates another use for the envelope. The folder could enhance security by lamination therein of pressure sensitive paper 21 and 21', also known as "carbonless" paper, manufactured by 3M and NCR corporation. Typing on this paper, through a thin transparent plastic cover sheet laminated thereto, can produce typed data which cannot be erased or altered without such tampering being made apparent. Thus, sensitive data such as drug usages, criminal arrests, foster care records, import licenses, or sensitive employment history data can be recorded from time to time and yet be substantially free from undetected tampering.

Another benefit of such a lamination process is that the paper core sheets reduce the likelihood of inadvertent scuffing or marking of the now protected carbonless paper forming a secure file. For example, the user folds the right hand portion of the paper folder of FIG. 4 over the left hand portion via fold line 6, and then files the folder away in a filing cabinet with fold or hinge 6 down. The result is that the carbonless paper inserts 21 and 21' are now protected from scuffing by the blanket or cushioning action of the relatively stiff paper core sheet, which is typically 10-15 mils thick. Further protection from unintentional frictional scuffing is attained by the low coefficient of friction of the external polyester which is difficult to scuff. Also, counterfeiting may be thwarted by imprinting customized indicia on the polyester cover sheets such as holograms.

Since the invention can be utilized in various ways other than as described above, the scope of the invention is to be restricted solely by the terms of the following claims and art recognized equivalents thereof.

What is claimed is:

1. Method of producing a large substantially flat laminated product by lamination of a pair of plastic cover sheets to a core sheet comprising the steps of:
   (a) providing an envelope to a user comprising a central core sheet having a first face portion and a second face portion opposite said first face portion, and a first light transmissive plastic cover sheet affixed to minor portions of said first face portion and a second plastic cover sheet affixed to minor portions of said second face portion, said first and second plastic cover sheets having heat activatable adhesives thereon facing said core sheet, and wherein said plastic cover sheets have the same physical characteristics which would cause each plastic cover sheet to individually warp to an unacceptable degree when separately laminated to the core sheet during lamination by heat and pressure thereto, and wherein said first and second plastic cover sheets have dimensions at least as great as a file folder when folded;
   (b) inserting an indicia bearing sheet between said core sheet and at least one of said plastic cover sheets; and
   (c) thereafter laminating the core sheet, the indicia bearing sheet(s), and the plastic cover sheets together by the application of heat and pressure thereto, thereby producing a substantially flat laminated product.

2. The method of claim 1 wherein said second plastic cover sheet is also light transmissive and including the steps of positioning a first indicia bearing insert sheet between said core sheet and said first plastic cover sheet and positioning a second indicia bearing insert sheet between said core sheet and said second plastic cover sheet, thereby to produce a two-sided display.

3. The method of claim 1 wherein the indicia bearing sheet inserted in accordance with step (b) is pressure sensitive.

4. Method of producing a large substantially flat laminated display product by lamination of a pair of plastic cover sheets to a core sheet, comprising the steps of:
   (a) providing a display envelope to a user comprising a central core sheet having a first face portion and a second face portion opposite said first face portion, and a first light transmissive plastic cover sheet joined to a second plastic cover sheet along a boundary portion but unlaminated to substantial face portions of the central core sheet, said first and second plastic cover sheets having heat activatable adhesives thereon facing said core sheet, and wherein the plastic cover sheets have the same physical characteristics which would cause each plastic cover sheet to individually warp to an unacceptable degree when separately laminated to the paper core sheet during lamination by heat and pressure thereto, and wherein said first and second plastic cover sheets have dimensions at least as great as a file folder when folded;
   (b) inserting an indicia bearing sheet between said core sheet and at least one of said plastic cover sheets; and
   (c) thereafter laminating the core sheet, the indicia bearing sheet(s), and the plastic cover sheets together by the application of heat and pressure thereto, thereby producing a substantially flat laminated product.

5. The method of claim 4 wherein said second plastic cover sheet is also light transmissive and including the steps of positioning a first indicia bearing insert sheet between said core sheet and said first plastic cover sheet and positioning a second indicia bearing insert sheet between said core sheet and said second plastic cover sheet, thereby to produce a two-sided display.

6. The method of claim 4 wherein the indicia bearing sheet inserted in accordance with step (b) is pressure sensitive.

7. Method of producing a large substantially flat laminated product by lamination of a pair of plastic cover sheets to a core sheet, comprising the steps of:
   (a) providing an envelope to a user comprising a core sheet having a first face portion and a second face portion opposite said first face portion, and a folded double-sized plastic sheet member having a first light transmissive plastic cover sheet joined to a second plastic cover sheet along a boundary portion, said first and second plastic cover sheets having heat activatable adhesives thereon facing said core sheet, and wherein the plastic cover sheets have the same physical characteristics which would cause each plastic cover sheet to individually warp to an unacceptable degree when separately laminated to the paper core sheet during lamination by heat and pressure thereto, and wherein said first and second plastic cover sheets have dimensions at least as great as a file folder when folded;
   (b) positioning the core sheet between the first and second plastic cover sheets and adjacent the boundary portion of the double-sized plastic sheet to cause edges of the core sheet to become aligned with edges of the plastic cover sheets;
   (c) inserting an indicia bearing sheet between said core sheet and at least one of said plastic cover sheets; and
   (c) thereafter laminating the core sheet, the indicia bearing sheet(s), and the plastic cover sheets together by the application of heat and pressure thereto, thereby producing a substantially flat laminated product regardless of the large size of the laminated product.

8. The method of claim 7 wherein both said first and second plastic cover sheets are light transmissive and including the steps of positioning a first indicia bearing insert sheet between said core sheet and said first plastic cover sheet and positioning a second indicia bearing insert sheet between said core sheet and said second plastic cover sheet, thereby to produce a two-sided display.

9. The method of claim 7 wherein the indicia bearing sheet inserted in accordance with step (c) is pressure sensitive.

* * * * *